United States Patent Office 3,221,074

Patented Nov. 30, 1965

3,221,074

PRODUCTION OF CONJUGATED DIOLEFINES

Herbert Muggleton Stanley, Tadworth, Surrey, England, assignor to British Hydrocarbon Chemicals Limited, London, England, a British company No Drawing. Filed June 21, 1962, Ser. No. 204,082
Claims priority, application Great Britain, June 23, 1961, 22,893/61
18 Claims. (Cl. 260—681)

The present invention relates to the production of conjugated diolefines.

The production of conjugated diolefines from 1,3-dioxanes, which are substituted at least once in the 4-position with an alkyl radical, by contacting the dioxane at an elevated temperature in the vapour phase with a catalyst, is known.

According to the present invention the process for the production of a conjugated diolefine comprises contacting steam and a 1,3-dioxane as hereinafter defined at an elevated temperature in the vapour phase with a volatile organic ester of an oxy-acid of phosphorus in the presence of a solid carrier material.

Suitably the volatile ester is introduced into the 1,3-dioxane feed before contact thereof with the carrier material. The dioxane feed may also contain unreactive diluents such as nitrogen or butane.

The carrier material may be any suitable contact material, and is preferably silica gel or a diatomaceous earth such as "Celite." Carrier materials consisting predominantly of silica are preferred.

The organic ester may be any suitable volatile ester of an oxy-acid of phosphorus, for example, triethyl phosphate, employed in proportions of the order of 0.1% by weight of the dioxane feed. The volatile ester of the oxy-acid of phosphorus may also be employed in admixture with a volatile organic ester of boric acid, e.g. tributyl borate, or in admixture with boric acid. The proportion of boric acid ester or boric acid present may also be of the order of 0.1% by weight of the dioxane feed.

The amount of volatile ester or esters which is suitably present in the initial dioxane feed may be reduced by employing a contact material already containing catalytically active phosphorous compounds (e.g. phosphoric acid) deposited thereon. Similarly after the reaction has been allowed to proceed for some time the volatile ester content of the dioxane feed may be reduced as the catalytically active components accumulate on the carrier material, but the amount of volatile ester present in the feed should not be less than about 0.01% by weight. It is within the scope of the invention to start reaction using a carrier material impregnated with phosphoric acid or boron phosphate, and to maintain catalytic activity and reaction efficiency at their optimum values by controlled addition of the volatile compounds.

The starting materials for the process of the present invention are 1,3-dioxanes of the formula:

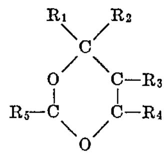

wherein $R_1$ is an alkyl radical, and $R_2$, $R_3$, $R_4$ and $R_5$ are hydrogen, alkyl, or aryl radicals. The use of 4,4-dimethyl-1,3-dioxane is preferred. The 1,3-dioxane starting material may be prepared by reacting an olefine hydrocarbon with an aldehyde in the presence for example of an aqueous sulphuric acid catalyst. Thus, 4,4-dimethyl-1,3-dioxane may be produced by the reaction of isobutene with formaldehyde in the presence of such a catalyst. In the case of 1,3-dioxanes prepared by reacting an olefine with an aldehyde the radicals $R_4$ and $R_5$ will be identical.

The reaction may be carried out over a wide range of temperatures, for instance between 200 and 450° C. It is preferred to maintain the temperature of the carrier between about 300° C. and 400° C. The space velocity of the reactant over the carrier material may likewise vary, and is suitably between about 0.1 and 100 liquid volumes of 1,3-dioxane per volume of carrier per hour. The optimum velocity will vary depending on the reaction temperature, and the particular carrier material in use. It is preferably adjusted so that the conversion of the dioxane is substantially complete. The reaction is preferably carried out close to atmospheric pressure, but increased or reduced pressures may be used.

For the process according to the invention the known methods of vapour phase catalysis may be employed. The carrier material may be a stationary or moving bed or a fluidised bed method may be used.

The diolefines can be recovered from the gaseous reaction product in any suitable manner, for instance by condensing the product followed by fractional distillation of the resulting liquid mixture. During the decomposition equimolar amounts of the original aldehyde are formed in producing the diolefine, together with small amounts of the original olefine and original aldehyde from which the dioxane was made and these may be recovered and re-used in the formation of the dioxane.

A variety of conjugated diolefines can be produced by the process of the invention, including isoprene from 4,4-dimethyl-1,3-dioxane.

The diolefines made in accordance with this invention are valuable chemical intermediates, for instance in the preparation of synthetic rubbers.

The process of the invention is further illustrated with reference to the following examples.

EXAMPLES 1–4

A series of runs was carried out in which a feed stream of 4,4-dimethyl-1,3-dioxane to which triethylphosphate was continuously added was passed continuously through a reactor charged with a silica gel carrier material. Each run was continued for 4 hours, the products from the first and fourth hour being collected and analysed. The feed stream was then discontinued and after purging the system with nitrogen, carbon was burned off the silica gel by passage of an air stream at 450°–500° C. After again purging with nitrogen the next run was carried out. Conditions and results are summarized in Table 1 below.

*Table 1*

REACTION CONDITIONS

| | |
|---|---|
| Temperature | 400° C. |
| Pressure | Atmospheric. |
| Volume ratio: Water:4,4-dimethyl-1,3-dioxane feed | 2:1. |
| Total feed, moles/litre silica gel/hr. | 238. |

| Example No. | Triethyl phosphate fed, wt. percent dioxane | Hours on Stream | Yield of products, moles per 100 moles dioxane fed | | | Dioxane conversion, percent approx. |
|---|---|---|---|---|---|---|
| | | | Isoprene | Isobutene | Formaldehyde | |
| 1 | 0.1 | 0–1 | 45 | 37 | 138 | 100 |
| | | 3–4 | 64 | 31 | 121 | 100 |
| 2 | 0.1 | 0–1 | 51 | 31 | 110 | 96 |
| | | 3–4 | 55 | 24 | 86 | 85 |
| 3 | 0.1 | 0–1 | 68 | 22 | 102 | 95 |
| | | 3–4 | 55 | 21 | 85 | 80 |
| 4 | 0.1 | 0–1 | 76 | 20 | 105 | 95 |
| | | 3–4 | 56 | 18 | 82 | 80 |

EXAMPLES 5–7

A series of runs was carried out under identical conditions to those used in Examples 1–4 except that a mixture of triethylphosphate and tri-n-butyl borate was employed and a fresh charge of carrier was used for each run. Results are summarised in Table 2 below.

*Table 2*

| Example No. | Triethyl phosphate fed, wt. percent dioxane | Triethylborate fed, wt. percent dioxane | Hours on Stream | Yield of products, moles per 100 moles dioxane fed | | | Dioxane conversion, percent approx. |
|---|---|---|---|---|---|---|---|
| | | | | Isoprene | Isobutene | Formaldehyde | |
| 5 | 0.01 | ---------- | 0–1 | 17 | 37 | 131 | 80 |
| | | | 3–4 | 20 | 46 | 138 | 85 |
| 6 | 0.1 | 0.1 | 0–1 | 25 | 35 | 127 | 85 |
| | | | 3–4 | 40 | 33 | 117 | 85 |
| 7 | 0.01 | 0.01 | 0–1 | 13 | 30 | 93 | 60 |
| | | | 3–4 | 17 | 44 | 122 | 75 |

I claim:

1. A process for the production of a conjugated diolefine which comprises contacting in the vapour phase and at a temperature between 200° and 450° C. steam and a 1,3-dioxane having the formula

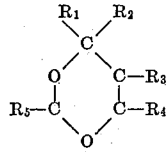

wherein R is an alkyl radical and each of $R_2$, $R_3$, $R_4$ and $R_5$ is selected from the group consisting of the hydrogen atom alkyl radicals and aryl radicals, together with a volatile organic ester of an oxy-acid of phosphorus, in the presence of a solid carrier material impregnated with a catalytically active phosphorus compound.

2. A process as claimed in claim 1 wherein the volatile ester of the oxy-acid of phosphorus is employed in admixture with a volatile boron compound selected from the group consisting of boric acid and volatile organic esters of boric acid.

3. A process as claimed in claim 2 employing a solid carrier material containing a boron compound and a correspondingly reduced proportion of volatile boron compound in the reactant feed.

4. A process as claimed in claim 3 wherein the solid carrier material is impregnated with boron phosphate.

5. A process as claimed in claim 2 wherein the volatile organic ester of boric acid is tributyl borate.

6. A process as claimed in claim 2 wherein the volatile boron compound is employed in proportions of the order of 0.1% by weight of the dioxane feed.

7. A process as claimed in claim 1 wherein the volatile ester is introduced into the 1,3-dioxane feed before contact thereof with the carrier material.

8. A process as claimed in claim 1 wherein the dioxane feed contains an unreactive gaseous diluent.

9. A process as claimed in claim 8 wherein the unreactive diluent is a member selected from the group consisting of nitrogen and butane.

10. A process as claimed in claim 1 wherein the solid carrier material is selected from the group consisting of silica gel and diatomaceous earth.

11. A process as claimed in claim 1 wherein the volatile organic ester is triethyl phosphate.

12. A process as claimed in claim 1 wherein the volatile organic ester is employed in proportions of the order of 0.1% by weight of the dioxane feed.

13. A process as claimed in claim 1 wherein the volatile organic ester is present in the feed mixture in amount not less than 0.01% by weight.

14. A process as claimed in claim 1 wherein the solid carrier material is impregnated with phosphoric acid as the catalytically active phosphorus compound.

15. A process as claimed in claim 1 wherein the dioxane is 4,4-dimethyl-1,3-dioxane.

16. A process as claimed in claim 1 wherein the temperature of the carrier is maintained between about 300° to 400° C.

17. A process as claimed in claim 1 employing a space velocity of reactant between 0.1 and 100 liquid volumes of 1,3-dioxane per volume of carrier per hour.

18. A process as claimed in claim 1 wherein the diolefines are recovered from the gaseous reaction product by condensation of the product followed by fractional distillation of the resulting liquid mixture.

References Cited by the Examiner

UNITED STATES PATENTS

| | | | |
|---|---|---|---|
| 2,220,430 | 11/1940 | Stanley | 260—682 |
| 2,237,866 | 4/1941 | Guinot | 260—681 |
| 2,337,059 | 12/1943 | Mikeska et al. | 260—681 |
| 2,350,485 | 6/1944 | Arundale et al. | 260—681 |
| 2,350,517 | 6/1944 | Mikeska et al. | 260—681 |
| 2,361,539 | 10/1944 | Friedrichsen | 260—681 |
| 2,386,324 | 10/1945 | Lorch | 260—681 |

ALPHONSO D. SULLIVAN, *Primary Examiner.*